May 27, 1947.    A. J. HAAGEN-SMIT    2,421,121
METHOD OF DEHYDRATING FOODSTUFFS
Filed May 5, 1945
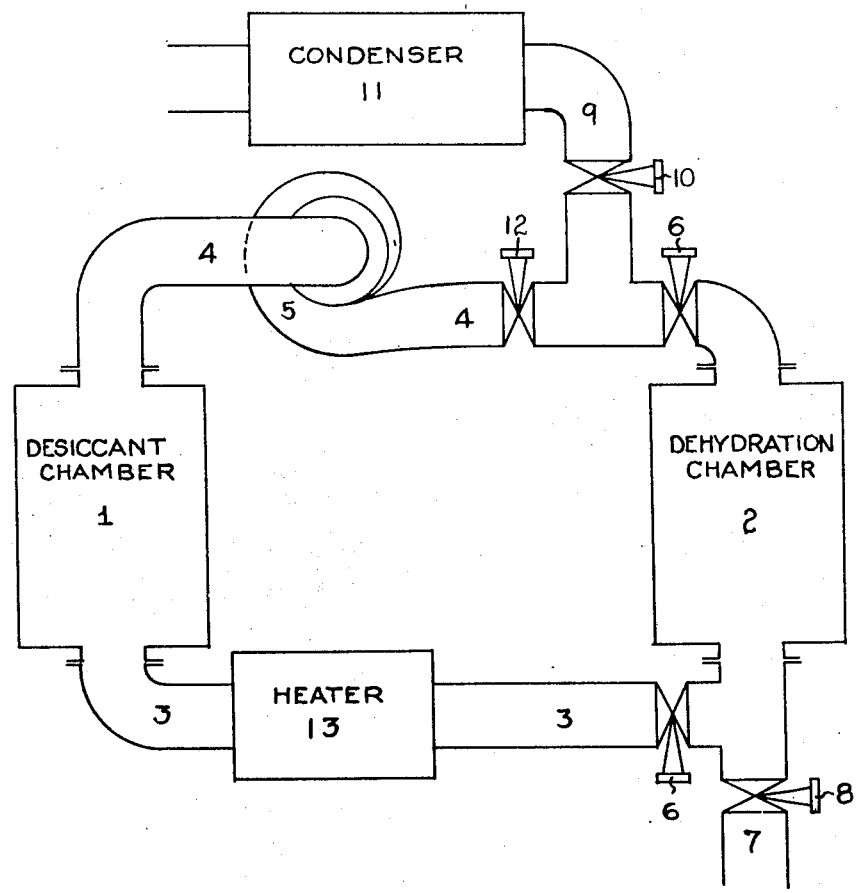
INVENTOR.
ARIE J. HAAGEN-SMIT
BY
Lyon & Lyon
ATTYS Patented May 27, 1947

2,421,121

UNITED STATES PATENT OFFICE 2,421,121

METHOD OF DEHYDRATING FOODSTUFFS

Arie J. Haagen-Smit, Pasadena, Calif., assignor to California Institute Research Foundation, Pasadena, Calif., a corporation of California Application May 5, 1945, Serial No. 592,208

10 Claims. (Cl. 99—199)

My invention relates to means and method of dehydrating foodstuffs, and among the objects of my invention are:

First, to provide a means and method of this character wherein water is removed from foodstuff without removing or at least minimizing the removal of the essential oils or volatile flavoring constituents inherent in the foodstuffs.

Second, to provide a means and method of this character wherein the foodstuff is maintained in a circulating atmosphere saturated or at least rich in selected essential oils or volatile flavoring constituents but relatively free of moisture. Such selected oils or volatile flavoring constituents may comprise natural substances extracted from similar foodstuff or may be synthetic in nature and not necessarily duplicating all of the essential oils and volatile flavoring constituents of the foodstuff or may be in some cases imitations or substances closely related to such essential oils or volatile flavoring constituents.

Third, to provide a means and method of this character wherein a closed system is employed containing a desiccant which has been saturated or substantially saturated with those oils or volatile flavoring constituents which it is desired to retain in the foodstuff undergoing treatment, the desiccant being selected for its affinity for water.

Fourth, to provide a means and method of this character wherein the desiccant as well as the substances used to saturate the system may be readily reconditioned or recovered to permit repeated use.

Fifth, to provide a means and method of this character which may be employed on the raw foodstuff and constitute the entire dehydration process or may be employed on foodstuffs which have been partially dehydrated by other or conventional methods.

Sixth, to provide a means and method of this character which avoids appreciable heating of the foodstuff, thus retarding enzyme action and avoiding the "cooked" taste of foodstuffs dehydrated by conventional processes.

Seventh, to provide a means and method of this character which by reason of the fact that the essential oils and other flavoring constituents are retained in the dehydrated foodstuff materially improves the flavor of the resulting product.

With the above and other objects in view as may appear hereinafter, reference is directed to the accompanying drawing in which the figure is a diagrammatical view of a means which may be employed to carry out my method.

My method of dehydrating foodstuff consists essentially of establishing a closed circulating system containing a desiccant which has been treated in such a manner that it will withdraw the water content of foodstuffs, particularly vegetables, while minimizing the withdrawal of the essential oils or other volatile flavoring constituents. Many of the various desiccants or drying agents may be employed providing they do not react or introduce undesirable odors or otherwise contaminate the foodstuff. It has been found, however, that anhydrous sodium sulfate or silica gel are particularly suited, not only because they do not react or introduce characteristic odors but also for the reason that they are readily saturated with the essential oils or other volatile flavoring constituents in the foodstuff. These substances have a great affinity for water, which affinity is not impaired by their saturation with such essential oils.

It is preferred to carry out my method of dehydrating foodstuffs in a closed system represented diagrammatically in the drawing. Such a system may comprise a desiccant chamber 1, a dehydrating chamber 2, connected by suitable conduits 3 and 4, one of which is provided with a suitable blower 5 or other means designed to maintain circulation. The dehydrating chamber 2 may be so arranged that it may be readily and quickly connected into or removed from the circulating conduits 3 and 4 whereby a series of such dehydrating chambers may be moved into position in sequence. Valves 6 may be provided in the conduits 3 and 4 to isolate the dehydrating chamber during disconnection and replacement. An air intake line 7, controlled by a valve 8 may be interposed in one of the conduits close to its connection with the dehydrating chamber; that is, between the valve 6 and the dehydrating chamber. A condenser line 9 may be similarly disposed in the other conduit, preferably at the discharge side of the blower 5. A valve 10 controls the line 9 to a condenser 11. A valve 12 may be positioned between the line 9 and the blower so that the condenser may be employed to collect vapors from the dehydration chamber 2 or from the desiccant chamber 1. A heater 13 may be provided in one of the conduits 3 or 4. The diagrammatical system shown in the figure is merely by way of illustration, thus, various arrangements may be employed.

The foodstuff is placed in trays or otherwise suitably arranged in the dehydrating chamber to provide adequate exposure to the circulating medium. The entire dehydrating system as well as the desiccant may be maintained rich in the essential oils which it is desired to retain in the dehydrated foodstuff. The partial pressure exerted by such essential oils in the system minimizes the evaporation of these oils from the foodstuffs. The partial pressure of the water or moisture is maintained at a materially lower value so that the water readily evaporates from the foodstuff and is absorbed in the desiccant.

Circulation is maintained between the food undergoing dehydration and the desiccant until the desired percentage of moisture has been removed. The dehydration chamber is then removed and another chamber substituted or, depending on the arrangement of the apparatus, the dehydration chamber is opened and fresh foodstuff inserted.

It is desirable, in order to conserve the essential oils employed in the system, that a minimum portion of the system be opened during the removal of the foodstuff and the insertion of a new batch. If the dehydration chamber is relatively large in volume, it may be desirable to close off the chamber from the remaining portion of the system and withdraw the essential oil laden atmosphere through the condenser 11 designed to condense out the oils so that they may be conserved for repeated use.

The desiccant may be used repeatedly. When the moisture content exceeds an optimum value, the desiccant may be treated to remove the volatile oils, and water. The oils, of course, are collected for reuse.

The essential oils or other volatile constituents of the foodstuff which it is desired to retain therein during drying may be extracted from similar foodstuff, for example—if the foodstuff be a vegetable such as an onion, a quantity of onions may be treated to remove the essential oils and these oils are used in the dehydration of other onions.

Furthermore, particularly in the case of highly flavored foodstuff such as onions, a substantial proportion of the essential oils may be removed without impairing the product; in fact, some removal may actually improve the product. Thus, in such cases the produce undergoing the dehydration may supply the needed essential oils or at least maintain the supply thereof.

Preferably, however, the essential oils are created by synthesis whenever possible. While ideally all of the essential oils or volatile flavoring constituents of the foodstuff may be employed in the desiccant and circulating system, in practice only certain of these substances need be used. That is, those substances which impart the more characteristic flavor to the foodstuff may be used and other substances of less significance omitted. Furthermore, by proper selection of the essential oils, certain flavoring constituents which might detract from the flavor may be allowed to escape with the water thus improving the flavor of the foodstuff in the course of dehydration.

In most instances the natural essential oils or synthetic essential oils are employed. In some instances, mere imitations of these oils, that is, substances which approximate but are not identical to these oils may be used.

My dehydration process may be employed on the raw foodstuff and constitute the entire dehydration process. However, the foodstuff may be partially dehydrated by conventional means. Such partial dehydration is terminated substantially before the temperature of the foodstuff has risen appreciably.

Between 94 and 98 percent of moisture may be extracted from foodstuff depending on the nature of the foodstuff and its physical condition, that is, whether whole or in slices. During the initial stages of dehydration by conventional means, the surfaces of the foodstuff remain moist and the evaporation of the moisture compensates for any rise in temperature which would otherwise occur. During the later stages of dehydration the surface of the foodstuff becomes dry and consequently the temperature rises. It has been found that much of the deterioration in the quality of the dehydrated foodstuff occurs or is brought about by the final stages of dehydration when conventional methods are employed. Thus, by terminating the conventional dehydration processes before the temperature of the foodstuff has risen appreciably and then subjecting the foodstuff to my process, much of the original flavor is retained. It should be pointed out that my process may be carried on at ambient temperatures, no heating whatsoever is required although, if for any reason a temperature higher than imbient is desired, such higher temperature may be used.

Many other embodiments of the invention may be resorted to without departing from the spirit of the invention.

I claim:

1. A method of dehydrating foodstuffs characterized by: subjecting the foodstuff to an atmosphere containing volatile substances corresponding to selected volatile flavoring constituents inherent in the foodstuff; substantially saturating a desiccant with said volatile flavoring constituents while maintaining said desiccant deficient in water content; and circulating said atmosphere through said foodstuff and said desiccant to reduce the water content of said foodstuff while retaining said selected volatile flavoring constituents in said foodstuff.

2. A method of dehydrating foodstuffs characterized by: partially dehydrating foodstuff; placing such partially dehydrated foodstuff in an atmosphere containing volatile substances corresponding to selected volatile flavoring constituents inherent in the foodstuff; substantially saturating a desiccant with said volatile flavoring constituents while maintaining said desiccant deficient in water content; and circulating said atmosphere through said foodstuff and said desiccant to reduce the water content of said foodstuff while retaining said selected volatile flavoring constituents in said foodstuff.

3. A method of dehydrating foodstuffs, characterized by: partially dehydrating the foodstuff by heated air at low humidity until migration of moisture to the surface of the foodstuff tends to fall below the rate of evaporation of the moisture at the surface; saturating a desiccant with selected volatile flavoring constituents inherent in the foodstuff; placing the partially dehydrated foodstuff in the presence of said desiccant; establishing an interchanging gaseous circulation between said foodstuff and said desiccant until the water content of the foodstuff is further reduced while retaining said flavoring constituents.

4. A method of dehydrating foodstuffs characterized by: subjecting the foodstuff to a mixed atmosphere; and maintaining said atmosphere rich in the vapors corresponding to selected essential oils inherent in the foodstuff and low in moisture content thereby to establish a high partial pressure on said essential oils sufficient to maintain said essential oils in the foodstuff and to establish a low partial pressure of moisture whereby the moisture content of said foodstuff is extracted.

5. A method of dehydrating foodstuffs characterized by: subjecting the water content of the foodstuff to a relatively low partial pressure, to extract the water; simultaneously subjecting selected essential oils inherent in the foodstuff to a relatively high partial pressure sufficient to inhibit extraction of said oils from said foodstuff.

6. A method of dehydrating foodstuffs characterized by: subjecting foodstuff to a heated air stream of low relative humidity for a preliminary period calculated to remove a portion of the water content and effect partial dehydration; subjecting the remaining water content of the partially dehydrated foodstuff to a relatively low partial pressure to continue the extraction of water; simultaneously subjecting selected oils inherent in the foodstuff to a relatively high partial pressure sufficient to inhibit extraction of said oils from said foodstuff.

7. A method of dehydrating foodstuffs characterized by: subjecting foodstuff to an atmosphere having low relative humidity; subjecting selected essential oils of the foodstuff, after a portion of the water content has been removed, to a relatively high partial vapor pressure sufficient to inhibit extraction of said selected essential oils.

8. A desiccant for dehydrating foodstuffs saturated with substances corresponding to selected essential oils of the foodstuff.

9. A desiccant for dehydrating foodstuff consisting of sodium sulfate substantially saturated with substances corresponding to the essential oils of the foodstuff.

10. A desiccant for dehydrating foodstuff consisting of silica gel substantially saturated with substances corresponding to the essential oils of the foodstuff.

ARIE J. HAAGEN-SMIT.

REFERENCES CITED

The following references are of record in the file of this patent:

UNITED STATES PATENTS

| Number | Name | Date |
|---|---|---|
| 1,929,437 | McComb | Oct. 10, 1933 |
| 2,225,627 | Flosdorf | Dec. 24, 1940 |